(12) United States Patent
Zimmerman

(10) Patent No.: US 10,640,193 B2
(45) Date of Patent: May 5, 2020

(54) MOUNTING SYSTEMS FOR MOUNTING AN ELEMENT TO A SURFACE

(71) Applicant: Carlisle Interconnect Technologies, Inc., Saint Augustine, FL (US)

(72) Inventor: Matthew Zimmerman, Franksville, WI (US)

(73) Assignee: Carlisle Interconnect Technologies, Inc., St. Augustine, FL (US)

( * ) Notice: Subject to any disclaimer, the term of this patent is extended or adjusted under 35 U.S.C. 154(b) by 466 days.

(21) Appl. No.: 15/656,447

(22) Filed: Jul. 21, 2017

(65) Prior Publication Data

US 2019/0023371 A1 Jan. 24, 2019

(51) Int. Cl.
*B64C 1/36* (2006.01)
*F16B 39/04* (2006.01)
(Continued)

(52) U.S. Cl.
CPC ............. *B64C 1/36* (2013.01); *F16B 9/054* (2018.08); *F16B 21/02* (2013.01); *F16B 21/12* (2013.01); *F16B 39/04* (2013.01); *H01Q 1/125* (2013.01); *H01Q 1/1207* (2013.01); *H01Q 1/28* (2013.01); *F16B 39/02* (2013.01)

(58) Field of Classification Search
CPC ........ H01Q 1/12; H01Q 1/1207; H01Q 1/125; H01Q 1/1264; H01Q 1/28; B64C 1/36; F16B 39/04; F16B 39/02; F16B 9/05; F16B 9/52; F16B 9/54; F16B 21/10; F16B 21/12

See application file for complete search history.

(56) References Cited

U.S. PATENT DOCUMENTS 497,872 A 5/1893 Goodwin et al.
2,360,626 A 10/1944 Weiser
(Continued)

FOREIGN PATENT DOCUMENTS

| CN | 205406707 U | 7/2016 |
| GB | 191502497 A | 6/1915 |
| GB | 497872 A | 12/1938 |

OTHER PUBLICATIONS

European Patent Office; Search Report and Written Opinion in related International Patent Application No. PCT/US2018/043291 dated Oct. 24, 2018; 14 pages.

*Primary Examiner* — Jonathan P Masinick
(74) *Attorney, Agent, or Firm* — Wood Herron & Evans LLP

(57) ABSTRACT

A mounting system for mounting an element to a surface includes a mounting element having a base and a threaded shaft extending from the base along an axis. The base is configured for mounting to a surface. An incremental nut rotates on the threaded shaft and moves up and down on the shaft. A fitting is coupled with the incremental nut and the fitting is further configured for coupling with an element to mount the element to a surface at a selected height above the surface. Apertures are formed in the incremental nut and fitting and the apertures of the incremental nut aperture and fitting are aligned at a plurality of rotational positions of the incremental nut along the threaded shaft for adjusting the height of the nut and fitting. In one embodiment the threaded shaft includes an aperture that is aligned with the incremental nut apertures for locking the nut at a selected height.

20 Claims, 16 Drawing Sheets

(51) Int. Cl.
  *H01Q 1/28* (2006.01)
  *H01Q 1/12* (2006.01)
  *F16B 9/00* (2006.01)
  *F16B 21/02* (2006.01)
  *F16B 21/12* (2006.01)
  *F16B 39/02* (2006.01)

(56) References Cited

U.S. PATENT DOCUMENTS

| | | | |
|---|---|---|---|
| 4,299,531 A | | 11/1981 | Seale et al. |
| 4,313,687 A | | 2/1982 | Martinez Apeztegui et al. |
| 5,121,128 A | | 6/1992 | van Lidth de Jeude et al. |
| 5,198,830 A | * | 3/1993 | Lin .................. H01Q 1/125 248/183.2 |
| 5,393,162 A | * | 2/1995 | Nissen ................ B66D 3/04 294/82.1 |
| 5,611,653 A | * | 3/1997 | Smith, II ............ F16B 39/04 411/395 |
| 6,404,400 B1 | * | 6/2002 | Tulloch .............. H01Q 1/125 343/765 |
| 7,686,529 B1 | * | 3/2010 | Le ..................... B64G 1/646 403/78 |
| 8,228,248 B1 | | 7/2012 | Kahle et al. |
| 8,844,866 B2 | | 9/2014 | De Azevedo et al. |
| 8,882,046 B2 | * | 11/2014 | Edsall ................... B64C 1/36 244/137.4 |
| 9,048,548 B2 | | 6/2015 | Palmer et al. |
| 10,059,426 B2 | * | 8/2018 | Flores .................. B64C 7/00 |
| 2016/0076579 A1 | | 3/2016 | Pailhories |
| 2016/0190675 A1 | | 6/2016 | Dasanayaka |

* cited by examiner

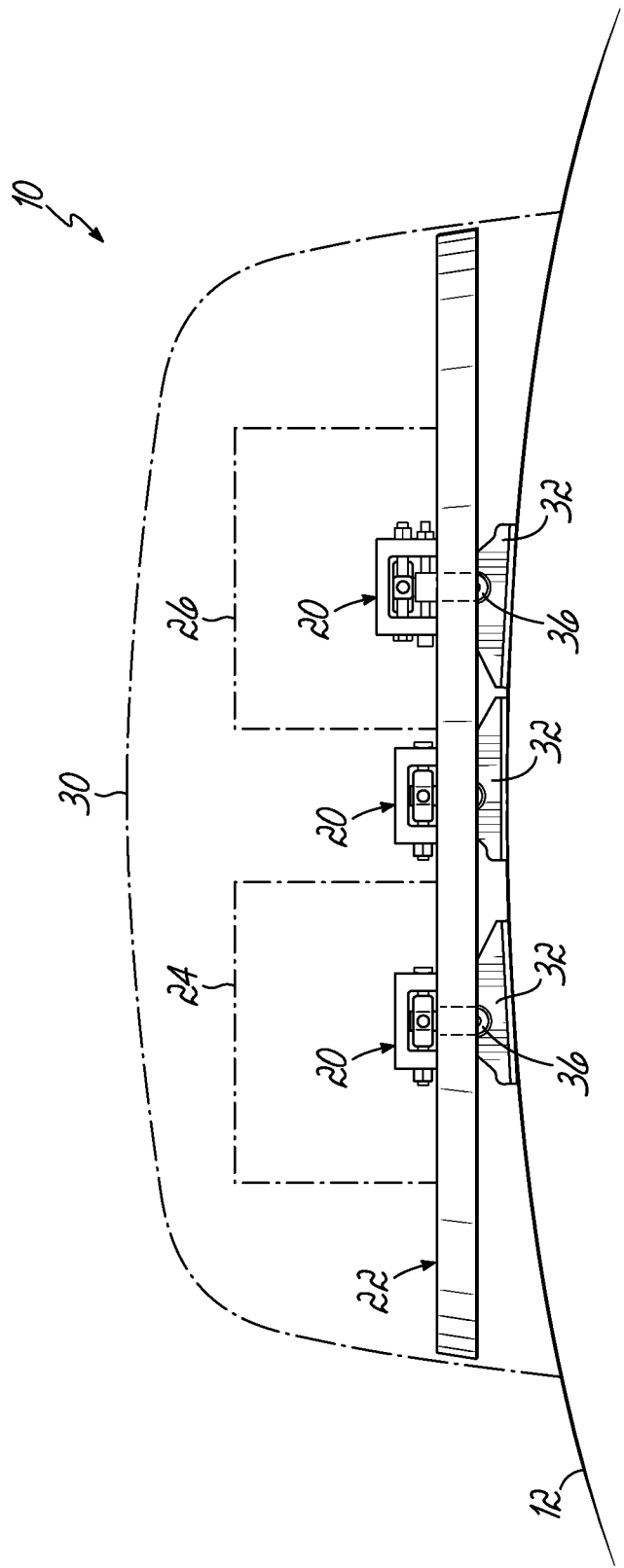

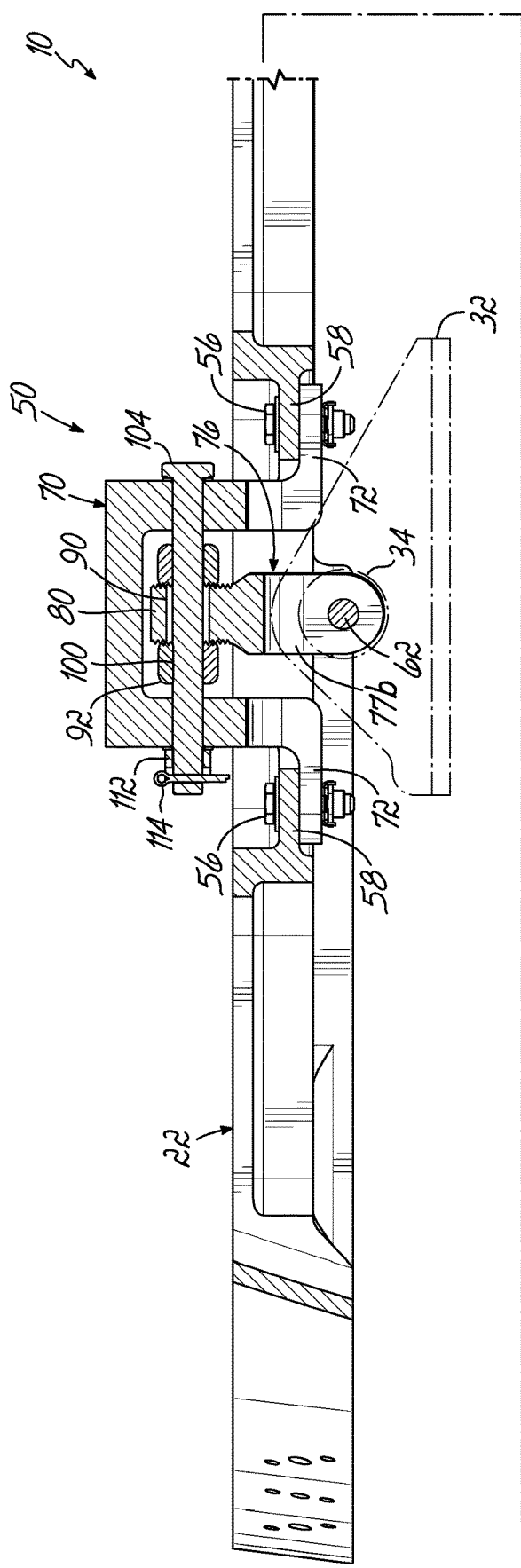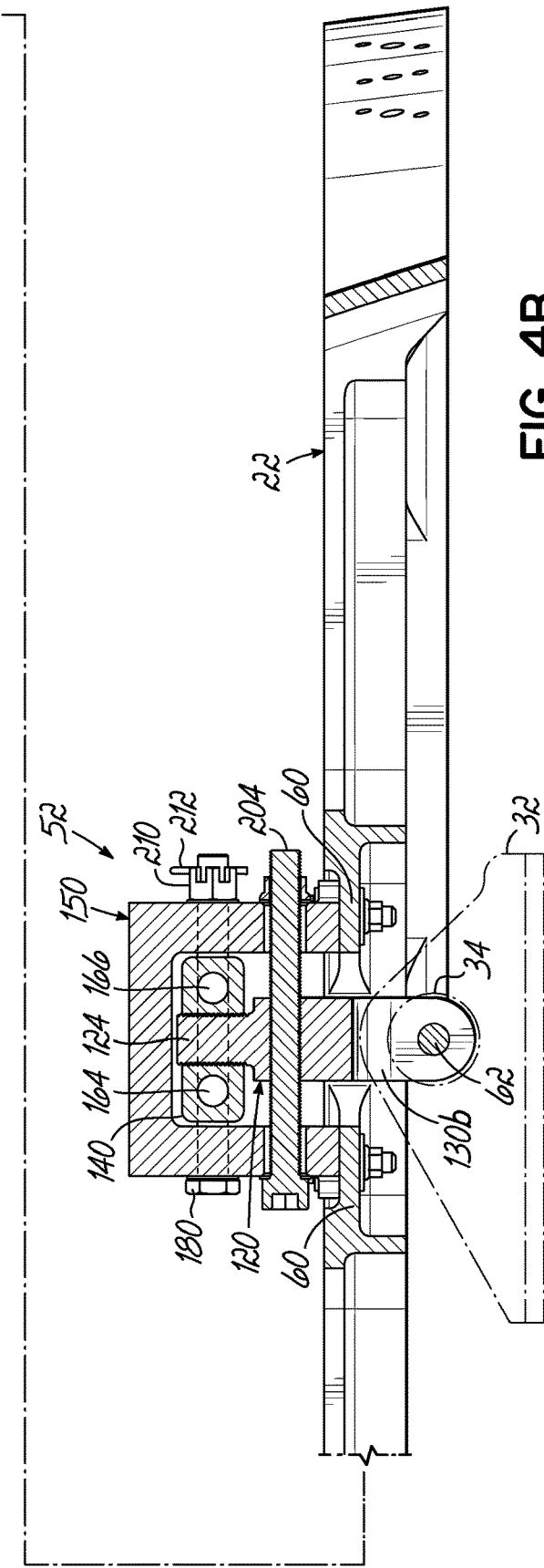
FIG. 4B

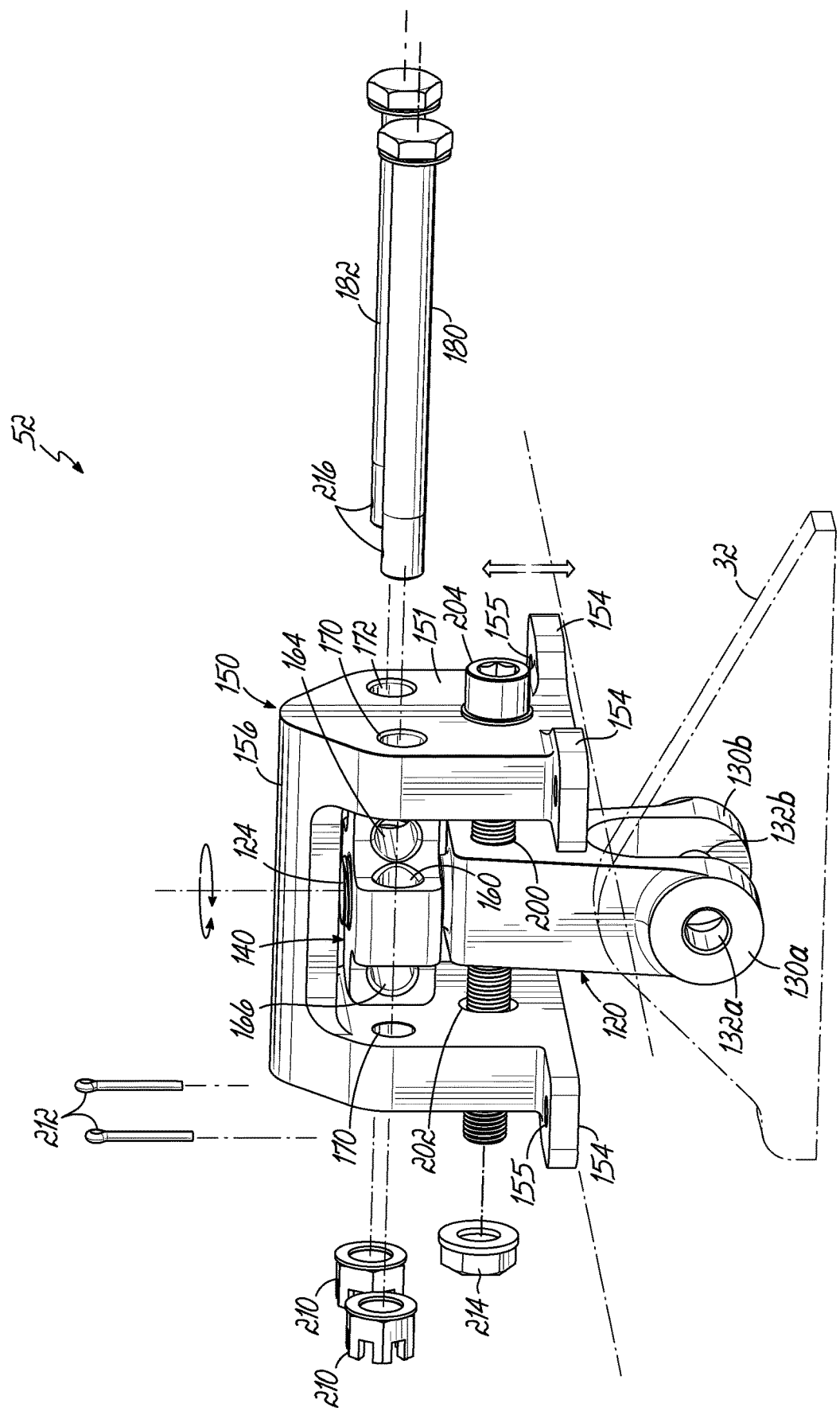

MOUNTING SYSTEMS FOR MOUNTING AN ELEMENT TO A SURFACE

TECHNICAL FIELD

The present invention relates generally to mounting systems and specifically to a system for mounting antenna systems and electronic systems to a surface of an aircraft.

BACKGROUND

In avionics, various communications systems are used in an aircraft for performance of the aircraft. Such aircraft mounted communication systems often involve and use various electronics systems and antenna elements for communicating with ground-based or satellite-based communication systems.

To that end, the antenna elements that are used for such communication systems are usually mounted on the outside of the plane, such as to a fuselage surface where they are exposed, in use, to outside elements in flight. As such, the system electronics and antenna elements as well as other outside airframe equipment (OAE) must be securely mounted to the plane and usually covered with a radome or cover of some kind for protection from the elements and in flight debris, such as birds. For mounting such elements and OAE systems, usually an adaptor plate or frame of some kind is used and the antenna elements and other electronic elements of the systems are mounted to the adaptor plate. The adaptor plate or frame is then mounted to the surface of the aircraft fuselage in an appropriate position. One such adaptor plate is the CarlisleIT ARINC 791 plate from Carlisle Interconnect Technologies, Inc.

As may be appreciated, the outside surface or skin of an aircraft is not always a smooth and consistent surface due to its construction from various sections that are coupled together and secured onto the aircraft frame. Usually a lightweight metal such as aluminum or alloys of aluminum are used. Furthermore, the aircraft and outside aircraft surface are subject to significant temperature variations that cause the fuselage to expand and contract in different ways during usage that are not always consistent.

Therefore, such considerations must be taken into account when mounting antenna and electronic system adaptor plates to aircraft. The adaptor plates must be affixed properly so that they lie tightly against the surface. Furthermore, they must be able to move and adjust as the surface of the plane expands and contracts in order to reduce fatigue of the plates. In the past, universal joints have been utilized for mounting or installing such adaptor plates to provide some movement and adjustability as the adaptor plate is installed. However, even with such elements, in order to achieve proper mounting alignment and height (z-axis) adjustments, installers have to use shims, mechanical spacers and other additional elements between the adaptor plates and aircraft surface. As may be appreciated, because of different aircraft surfaces and variables, different z-axis scenarios are often encountered during installation. Furthermore, to achieve alignment and installation there may be a certain amount of pre-load on some of the mounting elements that may result in part fatigue. As may be appreciated, such necessities and concerns make the mounting process more difficult as well as slow the process down significantly.

Accordingly, there is a need to improve the process of installation of adaptor plates and electronic/antenna systems to an aircraft outside surface. There is further a need to standardize or simplify the installation process for such outside adaptor plates and systems.

SUMMARY OF THE INVENTION

A mounting system for mounting an element to a surface includes, in one embodiment, a mounting element having a base and a threaded shaft extending from the base along an axis. The base is configured for mounting to the surface, such as the surface of an aircraft. An aperture is formed through the threaded shaft and is generally perpendicular to the shaft axis and is elongated in the direction of the shaft axis. An incremental nut is configured for rotating on the threaded shaft and moving up and down along the shaft axis for adjusting the height of the nut on the mounting element. The incremental nut has apertures formed therethrough generally perpendicular to the shaft axis and an incremental nut aperture and threaded shaft aperture are aligned at a plurality of rotational positions along the threaded shaft. A locking element passes through aligned apertures for securing the incremental nut at a selected height. A fitting is coupled with the incremental nut and further configured for coupling with an element to mount the element to a surface at a selected height above the surface.

In another embodiment, a mounting system includes a mounting element having a base and a threaded shaft extending from the base along an axis. The base is configured for mounting to a surface and an incremental nut is configured for rotating on the threaded shaft and moving up and down along the shaft axis for adjusting the height of the nut on the mounting element. The incremental nut has apertures formed therethrough. A fitting is configured for coupling with an element to mount the element to a surface at a selected height above the surface. The fitting includes an aperture formed therethrough where the incremental nut aperture and fitting aperture are aligned at a plurality of rotational positions of the incremental nut along the threaded shaft. A locking element passes through the aligned apertures for securing the incremental nut with the fitting at a selected height on the mounting element.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIG. 1 is a cross sectional view of a mounting systems in accordance with the invention mounting an adaptor plate and systems to a surface.

FIG. 4B is an exploded front view of an adaptor plate as in FIG. 4A to be mounted to a surface using embodiments of mounting systems in accordance with the invention.

FIG. 9 is an assembled perspective view of a mounting system in accordance with the embodiment of the invention illustrated in FIG. 8.

DETAILED DESCRIPTION OF EMBODIMENTS OF THE INVENTION

Figure 1A:
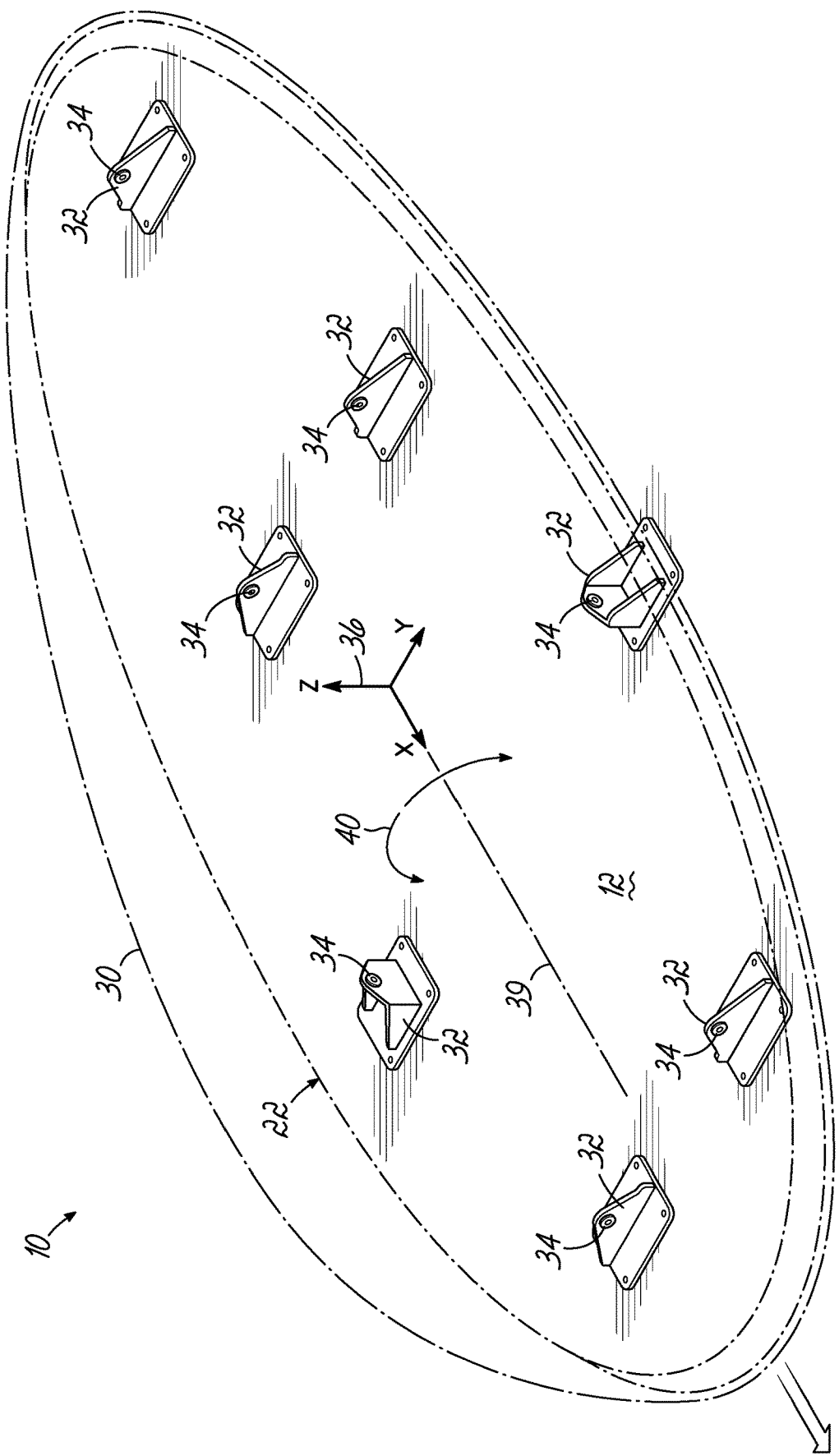
FIG. 1A is a plan view of a surface and fittings for mounting an element using embodiments of mounting systems in accordance with the invention.

FIG. 1 illustrates a front view of a mounting arrangement using the mounting systems of the present invention for mounting antenna systems and electronic communication systems to a surface, such as an aircraft surface. Referring to FIG. 1, the mounting arrangement 10 for mounting a system, such as an antenna system, is shown. The mounting arrangement 10 is mounted onto a surface 12, such as the outer surface of the fuselage or wing of an aircraft. In accordance with one embodiment invention, the arrangement 10 uses a plurality of mounting systems 20 of the invention that couple with the element 22, such as an adaptor plate, and also couple with a series of fittings 16 on the surface 12. The fittings 16 may include universal bearings for movement of the various mounting systems 20 with respect to the fittings 16. The fittings, in turn, are attached to surface 12 and thus provide some movement of the systems 20 and the mounted element 22 on that surface.

The mounting systems 20 of the invention are coupled with element 22 and are coupled with the fittings 32 at a plurality of positions on surface 12. Therefore, the invention may provide the desired adjustability and freedom of movement at several positions on the mounted element 22. In one example, the element 22 that is to be mounted to surface 12, such as an adaptor plate or frame, may contain one or more antenna systems 24 and/or other communications systems 26 for use by an aircraft. Such antenna systems 24 and communications systems 26 may include a variety of different components. The present invention is not limited to the systems that would be mounted using the invention. Furthermore, although an adapter plate 22 or other frame is described herein for being secured to the surface 12, such as an aircraft surface, other different elements may be mounted to other surfaces using the inventive mounting systems. Thus, the mounting systems of the invention are not limited to mounting aircraft elements to an aircraft surface but may be used for other mounting arrangements wherein the adjustments and freedom of movement provided by the invention are desired. Generally, with aircraft systems, for the purpose of protection, a radome 30 or some other cover is utilized and is coupled with the adapter plate 22 to protect the systems 24, 26 in flight as shown in FIG. 1.

FIG. 1A illustrates a perspective view of an exemplary layout of fitting elements that might be utilized on a mounting surface 12 for mounting the adapter plate 22 utilizing the mounting systems 20 of the invention. Specifically, various mounting systems 20 would each be coupled or fixed to the adaptor plate and would engage a respective fitting 32 as illustrated in FIG. 1A. Generally, such fittings will include spherical bearings or other elements 34 that provide movement of the mounting systems 20 and adapter plate 22 at the various positions or locations on surface 12. Mounting system of the invention provides additional movement in certain reference axes 36 as well as adjustability in certain axes as illustrated in FIG. 1A and discussed herein.

Figure 2:
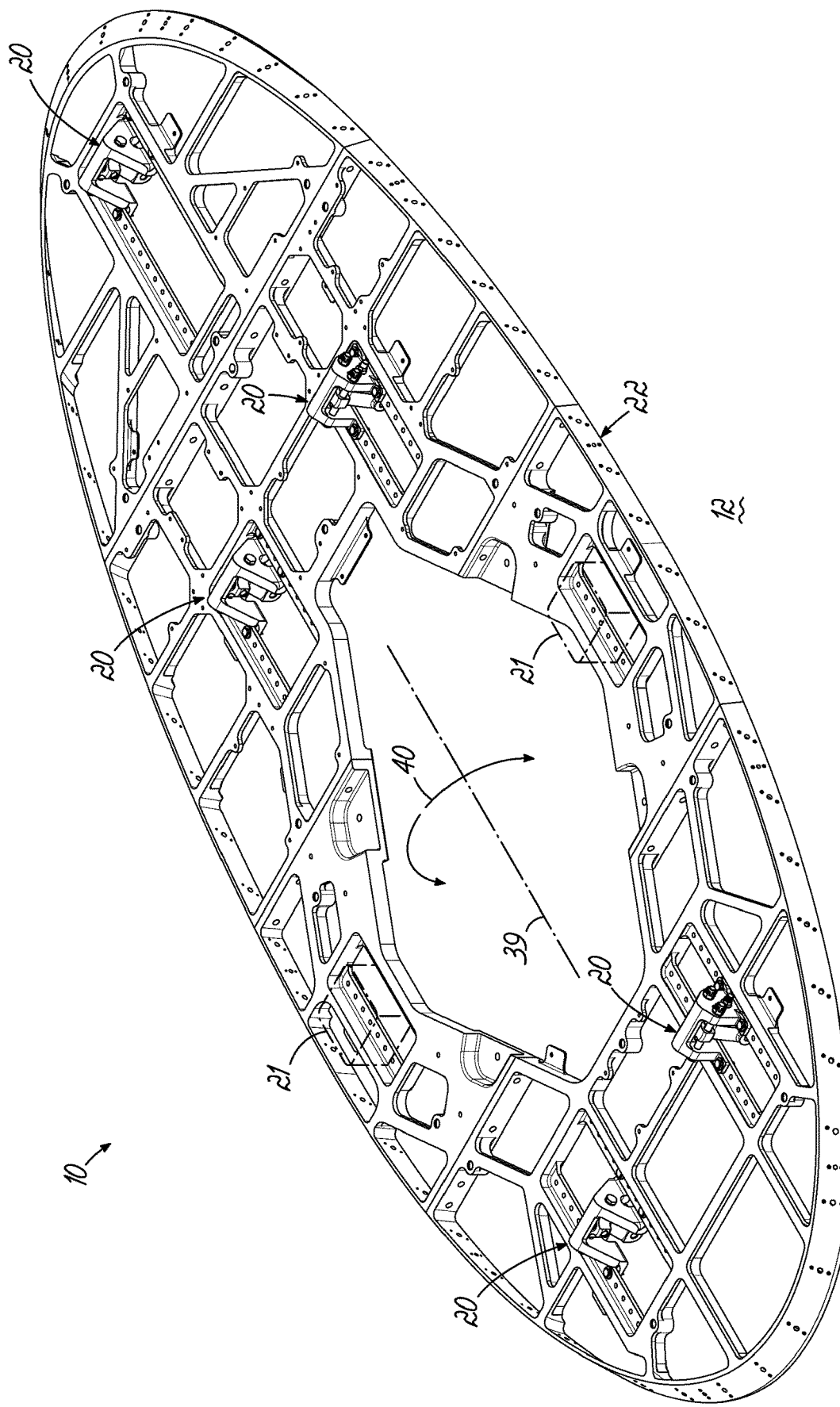
FIG. 2 is a plan view of an adaptor plate to be mounted to a surface using embodiments of mounting systems in accordance with the invention.

FIG. 2 illustrates a perspective view of one exemplary adapter plate 22 to be mounted using the mounting systems of the invention. As illustrated in FIG. 2, various of the mounting elements 20 are coupled with plate 22 at multiple positions on the plate 22 that align with the positions of the fittings 32 for securing the plate with the fittings 32 in accordance with embodiments of the invention. FIG. 2 illustrates different embodiments of mounting systems as discussed herein that may be used at different points or positions on the adapter plate 22 to provide the desired adjustability and freedom of movement. In accordance with one feature of the invention, several of the elements 20 provide the height (Z-axis) adjustability and freedom of movement of the invention. Different height adjustments thus allow for the general rotational positioning of the adapter plate 22 about the X-axis 39 as illustrated by reference arrow 40 (See FIG. 1A). Other mounting elements or systems 21 might be utilized in other areas of the adapter plate 22 in addition to the mounting systems of the invention but may not provide the adjustability of the mounting elements of the invention. Embodiments of the exemplary mounting elements 20 as disclosed herein have different adjustability and freedoms of motion and thus have somewhat different constructions.

Figure 3:
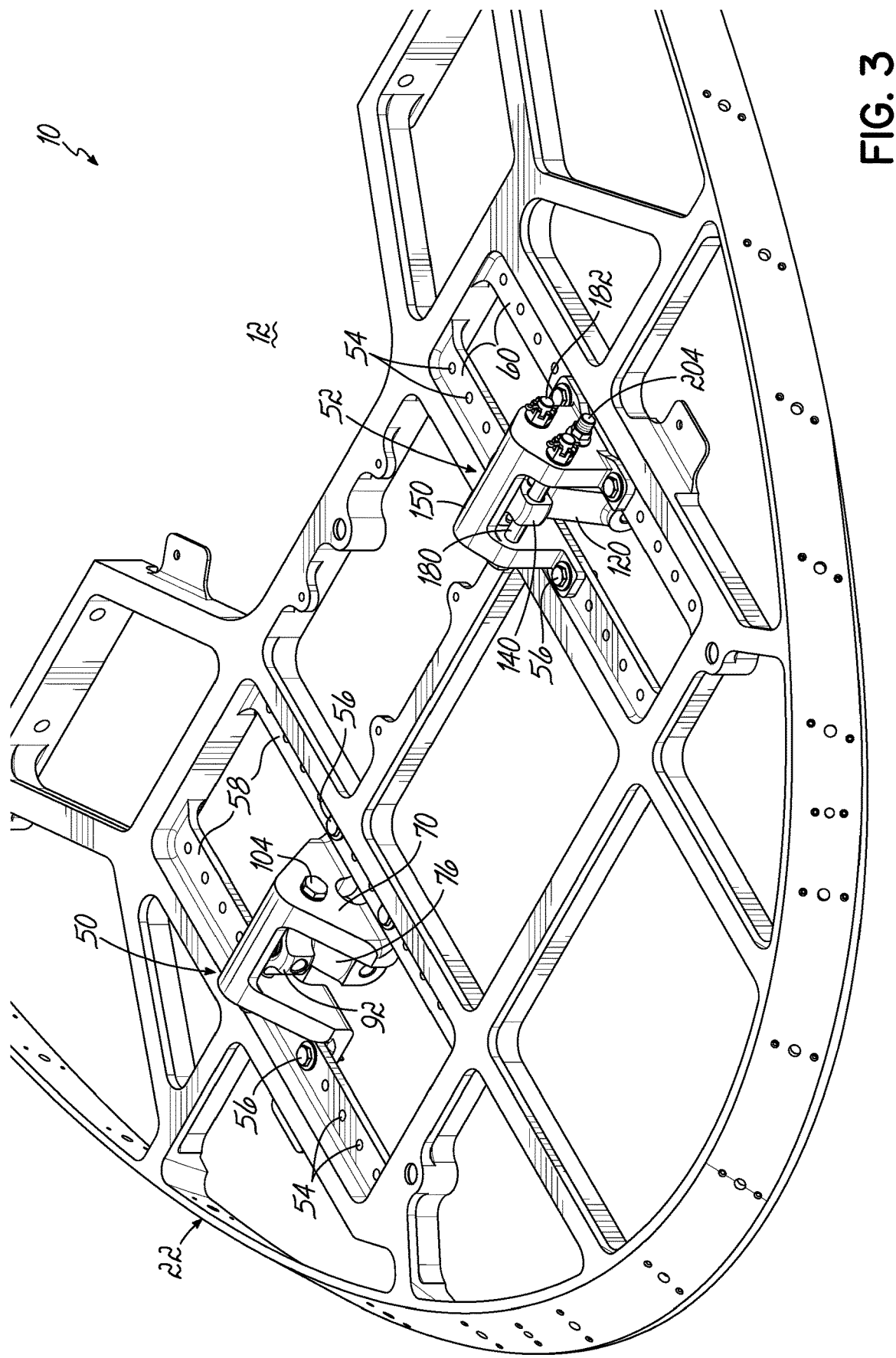
FIG. 3 is an enlarged partial plan view of an adaptor plate as in FIG. 2 to be mounted to a surface using embodiments of mounting systems in accordance with the invention.

FIG. 3 is a more exploded view of a portion of an overall arrangement 10 as illustrated in FIG. 2. Specifically, FIG. 3 illustrates one embodiment of a mounting element 50 at one position on plate 22 and another different embodiment of a mounting element 52 at another position on the adapter plate 22 as illustrated. The different mounting systems of the invention may be used at different positions on plate 22 to get desired positioning and adjustability of plate 22 on surface 12. To that end, the mounting systems 50, 52 are each coupled with the adapter plate 22 as shown for varying the height, in the Z-axis of the adapter plate over surface 12 as well as providing for various freedoms of movement with respect to other axes of the system when the adapter plate 22 and systems 24, 26 and radome 30 are installed.

Figure 4A:
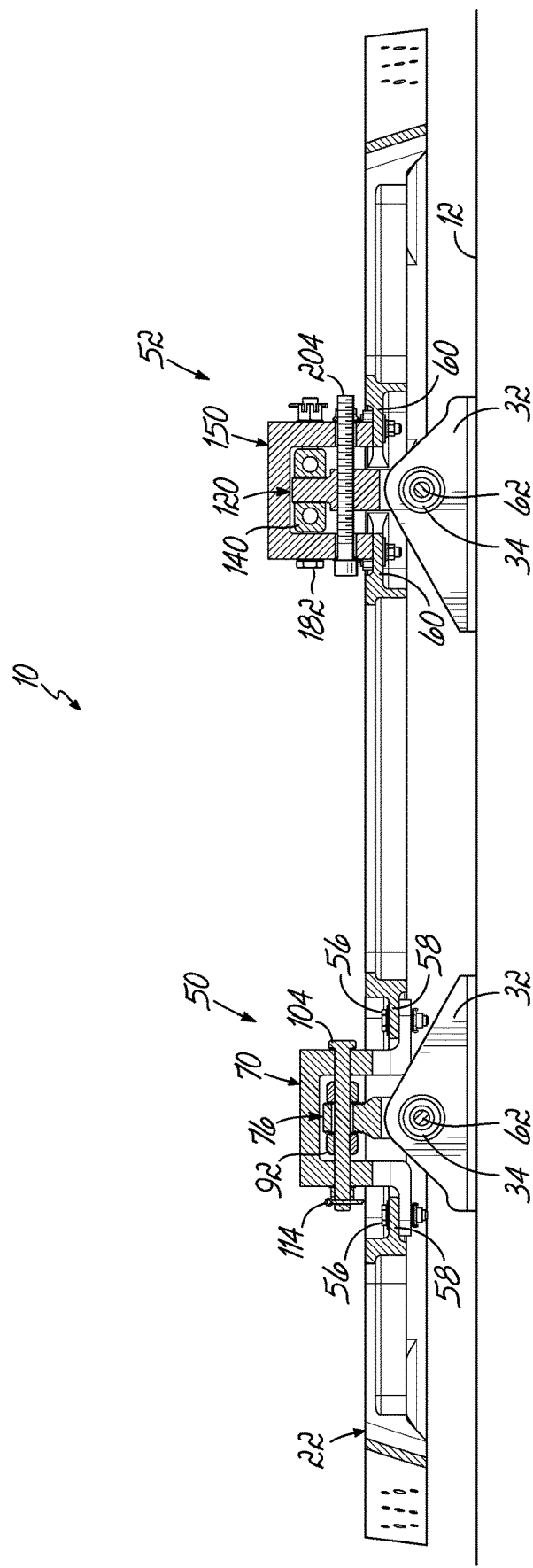
FIG. 4A is a front view of an adaptor plate as in FIG. 2 to be mounted to a surface using embodiments of mounting systems in accordance with the invention.

More specifically, the mounting systems 50, 52 include various fittings that may be coupled with plate 22 through appropriate mounting holes 54 of the plate and appropriate bolts/fasteners 56. As illustrated in the figures, the various mounting holes 54 may be laid out as tracks 58, 60 on either side of the mounting systems 50, 52 for positional adjustability of the mounting systems and where they are coupled with respect to the plate. Each of the mounting system fittings, as described herein, which couple with the adapter plate 22 or other element that is to be mounted, also adjustably couple with other elements of the mounting system for providing the desired adjustability and freedom of movement of the invention. The other elements of the mounting systems 50, 52 as described herein couple with the surface fittings 32, as illustrated in FIGS. 4A and 4B, with appropriate bolts or other fasteners 62 that extend through openings in the fittings. In one use of the mounting systems of the invention, the fittings 32 incorporate spherical bearings and fasteners 62 couple through openings in the spherical bearings 34 as well as through appropriate openings in other elements of the mounting system as discussed herein (See FIG. 10C). In that way, each of the mounting systems is coupled through a universal joint to fittings 32 and ultimately to surface 12. The fittings 32 are secured in an appropriate manner to the surface 12, such as the outer surface of the aircraft, as is conventionally known in the art.

FIGS. 4A and 4B illustrate mounting systems 50, 52 of the invention coupled with the adaptor plate 22 to be mounted, as well as suitable fittings 32 on surface 12. As is illustrated, the mounting systems may engage the adapter plate 22 or other element from above or below that element. For example, as illustrated in FIGS. 4A and 4B, mount system 50 has a fitting that mounts to plate 22 at a bottom surface or below the adapter plate, whereas mounting system 52 has a fitting that mounts to an upper surface or above the adapter plate with appropriate fasteners 56. The plurality of apertures 54 along the respective mounting tracks 58, 56 provide adjustability with respect to where the mounting systems 50, 52 engage the adapter plate 22. As the height of the fittings of the mounting systems are adjusted, the height of the various points of the adaptor plate are adjusted by being moved up and down in the Z-axis. The present invention is not limited to how the mounting system fittings interface with or couple with the adaptor plate and other ways of fixing the adaptor plate with the mounting system may be used so that adjusting the height of the fittings will adjust the height of the adaptor plate or other mounted element.

As illustrated in FIG. 2, various other positions on the adapter plate 22 include appropriate frame elements and mounting apertures for securing antenna systems 24 or communication systems 26 or other elements as appropriate to the plate. The adaptor plate 22 illustrated has an aerodynamic shape since it is used on an aircraft. The present invention is also not limited to the specific shape or configuration of adapter plate 22 or the systems mounted on the adapter plate 22.

Figure 5:
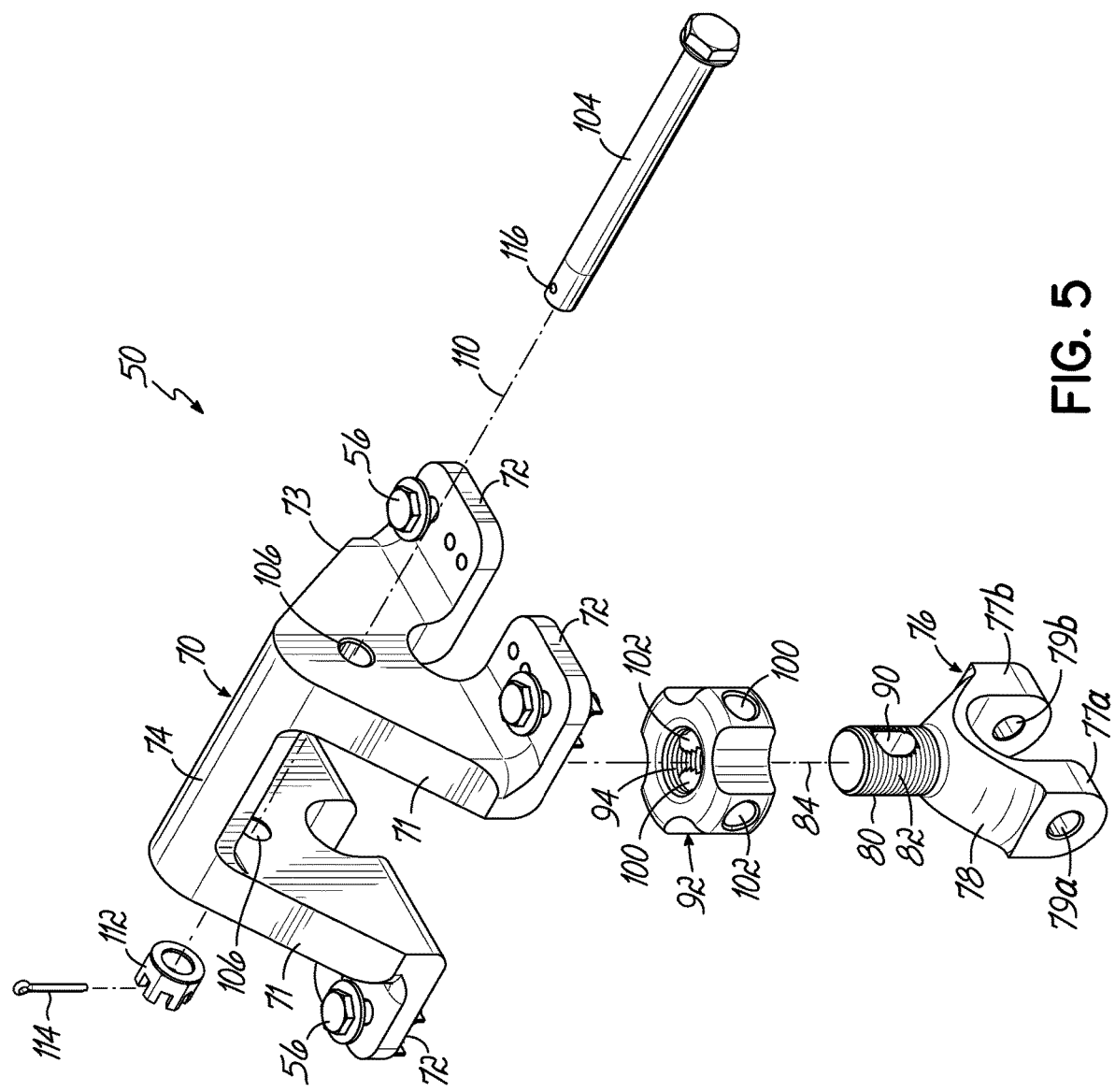
FIG. 5 is an exploded perspective view of a mounting system in accordance with an embodiment of the invention.

Turning now to the mounting systems, FIG. 5 is an exploded view of a mounting system 50 in accordance with one embodiment of the invention. Mounting system 50 includes a fitting 70 that is configured for coupling with an adapter plate or other element to be mounted to a surface with the mounting system. The fitting may be formed of a suitable strong and lightweight metal, such as aluminum. Fitting 70 includes opposing side elements 71 that cooperate to form a base 73 for the fitting. The base 73 includes one or more tabs or flanges 72 configured for receiving fasteners 56 and engaging with and coupling with the adapter plate to secure the fitting thereto. Fitting 70 also includes a bridge portion 74 spanning between the side elements for forming a unitary fitting that engages with other elements of the mounting system for raising and lowering the fitting 70 described herein.

Mounting system 50 further includes additional elements that sit below the fitting and are adjustable to change the height of the fitting with respect the mounting system. A mounting element 76 has a base 78 and a threaded shaft 80 that has external threads 82 thereon. An incremental nut 92 is threaded on the shaft. The threaded shaft extends upwardly from the base 78 along an axis 84 as shown in FIG. 5. The illustrated mounting element and nut may be formed of a suitable strong and lightweight metal, such as stainless steel. Generally, when the mounting system is mounted as illustrated in FIGS. 1A and 2, the threaded shaft 80 and axis 84 will generally extend in what might be defined as the Z-axis direction (see FIG. 1A). In that way, the mounting system provides adjustment of fitting 74 upwardly and downwardly along the Z-axis which translates into similar movement with respect to a portion of the adapter plate that is mounted to surface 12 through the mounting system 50.

Figure 6:
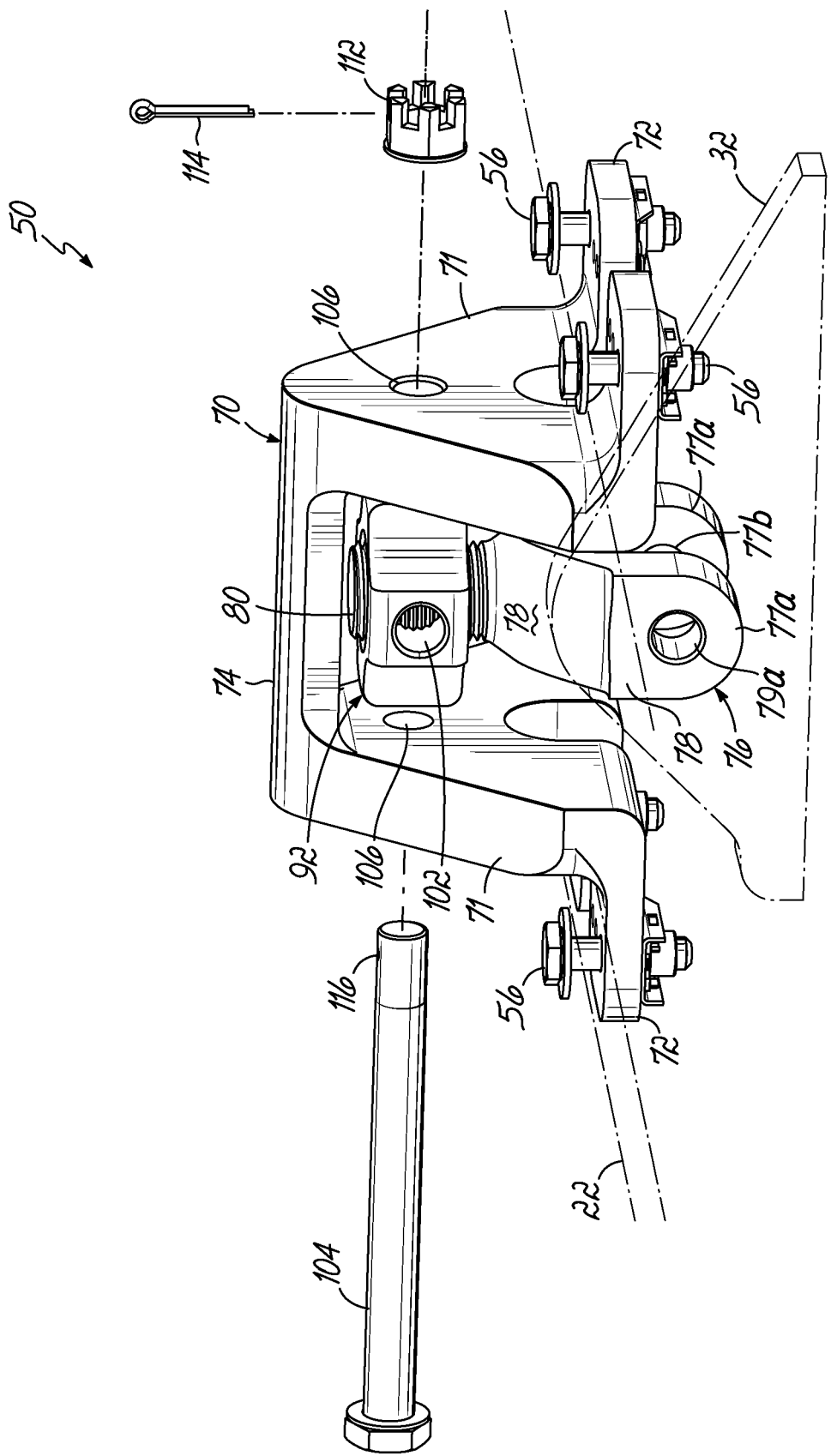
FIG. 6 is an assembled perspective view of a mounting system in accordance with the embodiment of the invention illustrated in FIG. 5.
Figure 7A:
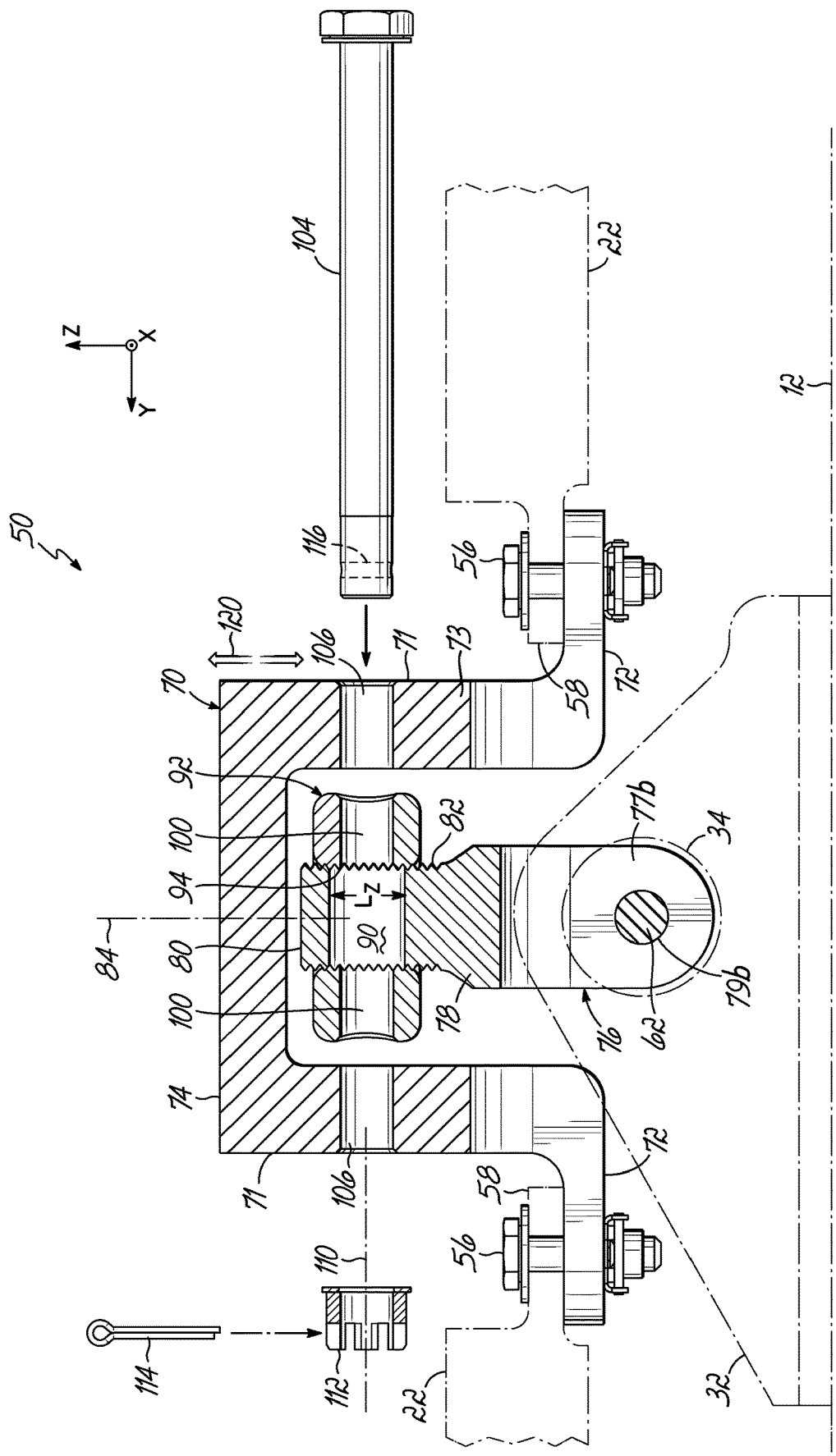
FIG. 7A is a cross sectional view of a mounting system in accordance with the embodiment of the invention illustrated in FIG. 5.
Figure 7B:
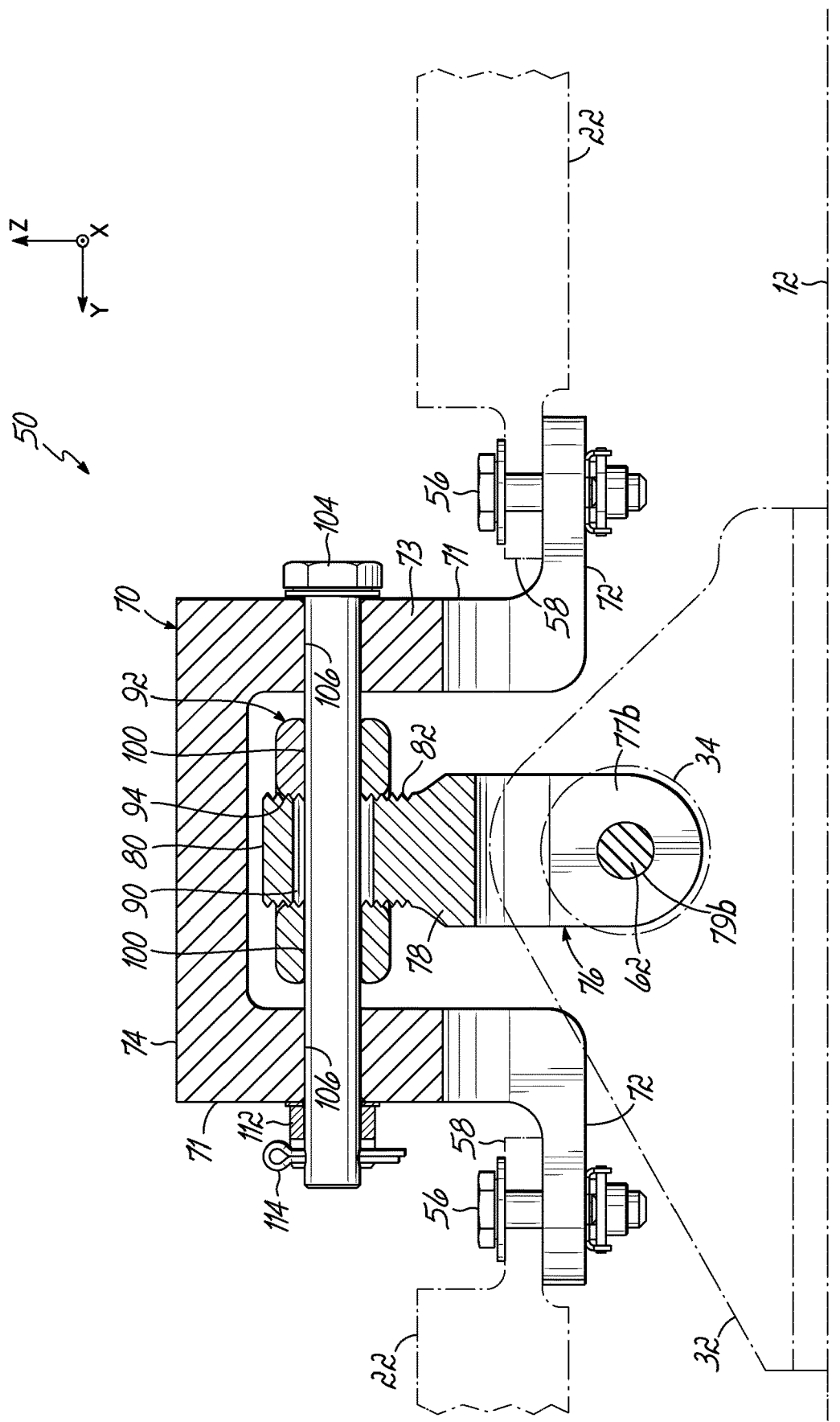
FIG. 7B is another cross sectional view of a mounting system in accordance with the embodiment of the invention illustrated in FIG. 5.
Figure 7C:
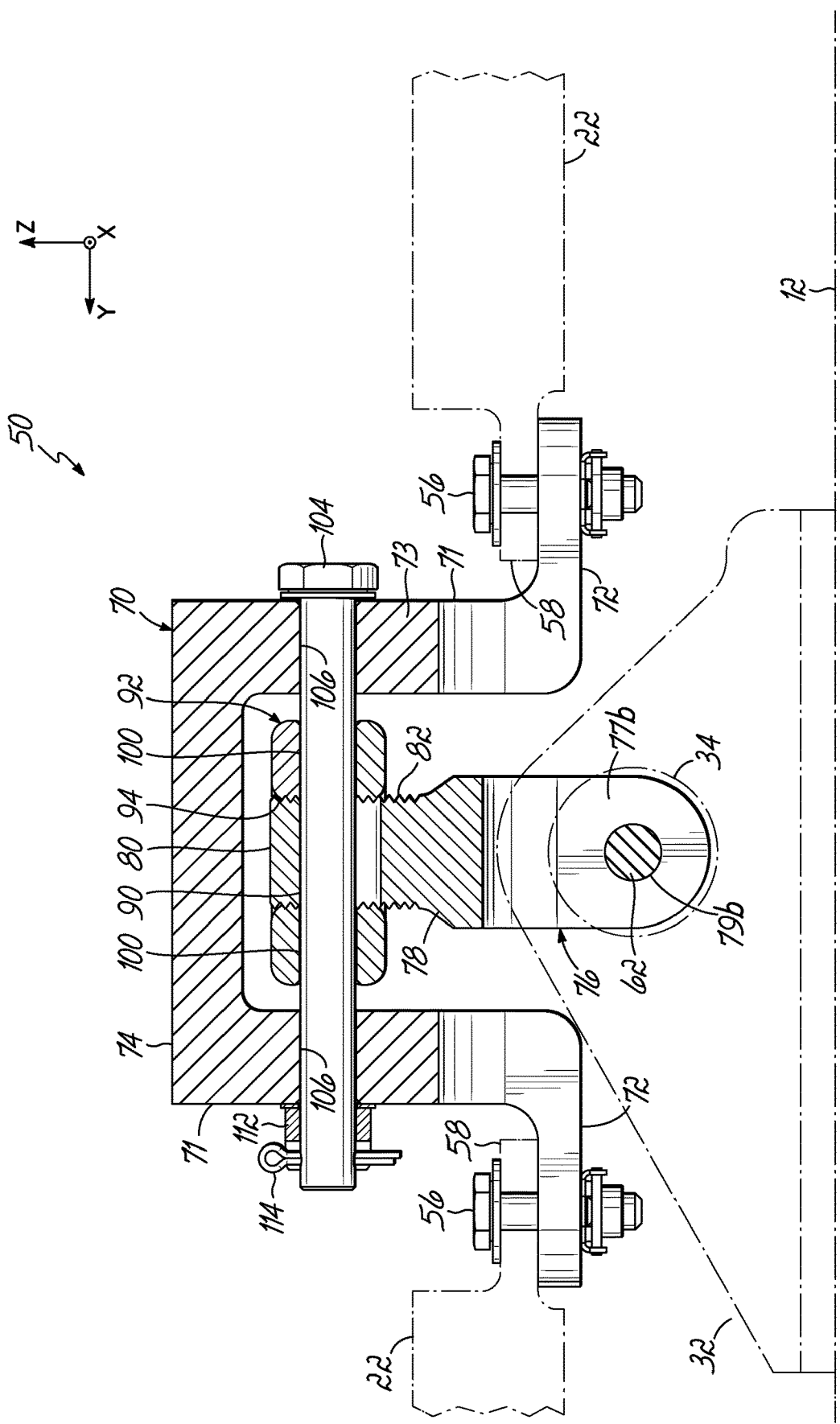
FIG. 7C is another cross sectional view of a mounting system in accordance with the embodiment of the invention illustrated in FIG. 5.

Referring to FIGS. 6-7C, the mounting element 76 is in the form of a clevis element, and the base 78 of the clevis element 76 embodiment is configured for mounting to the surface 12, such as through engagement with fitting 32 in the illustrated embodiment of the invention. The base 78 of the clevis element 76 is generally U-shaped with opposing prongs 77a, 77b having apertures 79a, 79b extending therethrough. A pin or bolt extends through the prongs 77a, 77b and respective apertures for coupling-base 78 and the clevis element 76 to a fitting 32. The bolt or pin 62 also extends through an appropriate opening in the fitting 32, such as through the opening of a spherical bearing 34 (See FIG. 10C). In that way, the clevis element 76 is coupled to surface 12 and has a freedom of motion provided by spherical bearing 34 that translates to a freedom of movement to the entire mounting system 50 on surface 12. The clevis element 76 and threaded shaft 80 may also rotate about the axis of pin or bolt 62.

In accordance with one aspect of the invention, the threaded shaft includes an aperture 90 formed therethrough. The aperture is formed through the threaded shaft to extend in a direction that is generally perpendicular to the shaft 80 and shaft axis 84. As used herein, the term aperture may refer to a through hole or passage as described that passes through the various elements. In some instances, such apertures of separate elements may then be aligned as described for securing the relative position of the elements with respect to one another. The term aperture is also used to describe through holes or passages, such as through the fittings, that have disconnected portions on different sides of the fittings but which are aligned in space along an axis and cooperate to form a generally unitary through hole or passage to receive a pin, bolt or other locking element. Therefore, the term aperture is not meant to be limiting in scope with respect to the invention.

In accordance with another aspect of the invention, the aperture 90 is elongated in the direction of the shaft axis 84. That is, with respect to the reference system provided in FIG. 1A, the aperture 90 is elongated in the Z-axis direction along the axis of the threaded shaft, as illustrated in FIG. 5 and FIGS. 7A-7B. As described herein, the Z-axis elongation provides a height adjustment feature to the mounting systems in accordance with one feature of the invention.

Referring again to FIG. 5, mounting system 50 further includes an incremental nut 92 having an opening 94 with internal threads that are configured for being threaded onto shaft 80. In that way, the incremental nut is configured for rotating on the threaded shaft and moving up and down along the shaft axis 84 (Z-axis) for adjusting the height of the nut 92 on the clevis element 76.

For providing height adjustment of fitting 70 and thus the adapter plate 22, the fitting 70 is coupled with the incremental nut 92 and threaded shaft. To that end, the incremental nut has at least one aperture formed therethrough that is also generally perpendicular to the shaft axis 84, when the nut is threaded to the shaft. Specifically, in the illustrated embodiment, the incremental nut 92 as illustrated in FIG. 5 includes a plurality of apertures 100, 102 that extend therethrough across the incremental nut. Specifically, the apertures 100, 102 extend from one side of the nut, through the threaded opening 94 and then out the other side of the incremental nut. That is, portions of the apertures are formed in opposite sides of the nut and align to form effectively the respective aperture for receiving a locking element as discussed herein.

In one embodiment of the invention, the apertures 100, 102 extend at an angle with respect to each other in the incremental nut. That is, aperture 100 extends at an angle to the other aperture 102. More specifically, in the illustrated embodiment there are the pair of apertures and they extend at angles wherein one aperture extends at an angle that is generally perpendicular to another aperture. As discussed herein, such apertures 100, 102 provide alignment positions for the incremental nut aperture with the threaded shaft aperture 90 at generally 90 degree or 90° positions around the incremental nut 92.

More specifically, the incremental nut is rotated on the threaded shaft 80 of clevis element 76 to move up and down the shaft. At certain positions of rotation, one of the incremental nut apertures 100, 102 will be aligned with the elongated aperture 90 through shaft 80. That is, at a plurality of rotational positions of the incremental nut along the thread shaft, the apertures 100, 102 will alternately align with aperture 90. Since the apertures are generally perpendicular with each other, there will be alignment of aperture 90 with one or the other of the apertures 100, 102 at 90° increments around the 360° rotation of the nut 92. Upon such alignment, a locking element can engage the aligned apertures and lock the nut at a certain height position on the shaft 80. In the illustrated embodiments, the locking element includes a locking pin or bolt, such as a locking pin 104, that may be positioned to extend through the aligned apertures and through the shaft 80 and incremental nut 92. This prevents further rotation of the nut on the shaft and thus locks the height of the nut and the height of the apertures 100, 102 on the nut. Simultaneously, locking pin 104 extends through apertures 106 formed in the fitting 70 thereby coupling the fitting with the nut. As such, fitting 70 is coupled with incremental nut 92 such that the height of the nut 92 on shift 80 in the direction of the Z-axis 84 will set or determine the height of fitting 70 with the mounting system 50. Since clevis element 76 is coupled with both a fitting 32 on surface 12 and the fitting 70, attached to plate 22, this height adjustment, in turn, sets the height of the adapter plate 22 over surface 12. That is, the locking pin 104 passing through the aligned apertures 100, 102 and 90 will prevent the incremental nut from further rotation on shift 80 and thus will secure the incremental nut and any fitting 70 coupled therewith at a selected height on the clevis element 76.

As such, using the mounting element 50, the height of fitting 70 and adapter plate 22 may be readily and easily adjusted on the Z-axis through rotation of the incremental nut 92 with locking pin 104 removed. Once the desired height of the nut is achieved, the locking pin 104 may be inserted to secure the height of incremental nut and the height of fitting 70 and plate 22 on the surface 12. In accordance with one feature of the invention, the plurality of apertures 100, 102 formed in incremental nut 92 provide adjustment positions at quarter turn or 90° intervals or positions around the incremental nut. That is, the incremental nut 92 may be adjusted in increments by rotation of incremental nut 92 at 90° increments to achieve alignment of a respective aperture 100, 102 with aperture 90. The height adjustment achieved for each incremental turn or 90° rotation of the nut 92 will be determined by the thread count of the threads used to couple threaded shaft 80 and incremental nut 92.

In the illustrated embodiment of the invention, two apertures 100, 102 positioned generally perpendicular to each other provide positions at 90° increments around incremental nut as discussed. However, the invention might also incorporate additional apertures, such as at 45° increments or positions around the nut 92 ($\frac{1}{8}^{th}$ turn increments). As may be appreciated, two additional apertures, like apertures 100, 102, would be formed through the side of the nut 92. As such, the present invention is not limited to having just two apertures through nut 92 for achieving 90° increments of rotation and other smaller increments may be used. Similarly, just a single aperture might be used and the adjustability might be in 180° rotational increments(½ turn increments) achieved by aperture alignment.

Locking pin 104 might be secured in the fitting 70 by an appropriate cap nut 112 and cotter pin or split pin 114 that extends through a receiving aperture 116 formed in locking pin 104. Referring to FIG. 6, when mounting the adapter plate 22 onto surface 12, the plate 22 with fitting 70 coupled thereto may be positioned so that the fitting 70 overlies the clevis element 76 and incremental nut 92. For adjusting the height of mounting system, the incremental nut 92 is rotated appropriately until a height position is reached where one of the apertures 100, 102 aligns with aperture 90 in the threaded shaft 80. Then, locking pin 104 may be inserted to secure fitting 70 and the plate 22 with the mounting system 50 at a suitable height above surface 12.

The feature of mounting system 50 provides and adjustment range in the Z-axis 84 for quick and proper mounting of the plate at the position on the plate where the mounting system is located. The movement and Z-axis adjustment is illustrated by reference arrows 120 illustrated in FIG. 7A. The range of adjustment in height is provided by the length of the elongated aperture 90 along the shaft axis. As the incremental nut moves up and down the shaft of the clevis element, there will be certain upper and lower positions wherein the apertures 100, 102 will no longer align with elongated aperture 90 to receive a locking pin 104. More specifically, as noted herein, the aperture 90 formed in the threaded shaft 80 is elongated in the direction of the shaft axis or Z-axis 84, and as such, the elongated aperture 90 has a length dimension in the Z-axis $L_z$. In accordance with the invention, the length dimension $L_z$ of the elongated aperture is greater than the diameter of the corresponding apertures 100, 102 the incremental nut 92 as well as locking pin 104. As such, the height adjustment of the incremental nut 92 and fitting 70 along the Z-axis 84 and shaft 80 is provided over a height range as dictated by the length $L_z$ of the elongated aperture 90. Accordingly, by incremental turns of the incremental nut 92 the apertures 100, 102 move up and down shaft 80 and still provide for aperture alignment at various height positions along shaft 80 until the ends of the elongated aperture 90 are reached and any further incremental turns will not provide for full alignment of an aperture 100, 102 with the aperture 90 for passing locking pin 104 through the aligned apertures.

Referring to FIGS. 7B and 7C, incremental nut 92 is rotated to provide alignment wherein the apertures 100, 102 are aligned with aperture 90 so that the aperture may be engaged with locking pin 104 and fitting 70 at a selected height. Depending upon the length $L_z$ of the elongated aperture, there will be a maximum height position for locking pin 104 as illustrated in FIG. 7C. As noted, rotation of the nut 92 past that maximum position will not result in alignment of the apertures to allow the locking pin 104 to pass through the apertures. Similarly, there will be a lower height limit at the bottom end of the aperture 90 dictating the lowest Z-axis height for the nut and the fitting 70. The dimension of the elongation $L_z$ with respect to aperture 90 may be in the range of 2 millimeters (mm)-6 millimeters (mm) and for providing a range of overall height adjustment for fitting 70 and adapter plate 22. In that way, the mounting system effectively provides a range of movement that may be essentially ±1 mm up to ±3 mm between the minimum and maximum height adjustments.

The invention provides a simple incremental adjustment of the mounting height for fitting 70 and thus provides a quick and easy height adjustment for certain points of the adapter plate without requiring shims or other structures between the plate 22 mounting structures and surface 12. This provides a significant savings in time and complexity in mounting the plate element.

In addition to the movement provided by the spherical bearing 34 of the fitting 32, the mounting system 50 also provides additional freedom of movement for the fitting 70 and plate 22 along the Y-axis or axis 110 as illustrated in FIG. 7A. Referring to the orientation of a reference system 36, the fitting may slide laterally along the axis 110 of locking pin 104 or the Y-axis when mounted. Still further, the fitting may rotate about that same Y-axis as shown as fitting rotates on or about the locking pin 104. This provides further movement and adaptability of the invention once it is mounted to adapt to the expansion and contraction of the surface 12, such as on an aircraft surface, after the plate is mounted.

Figure 8:
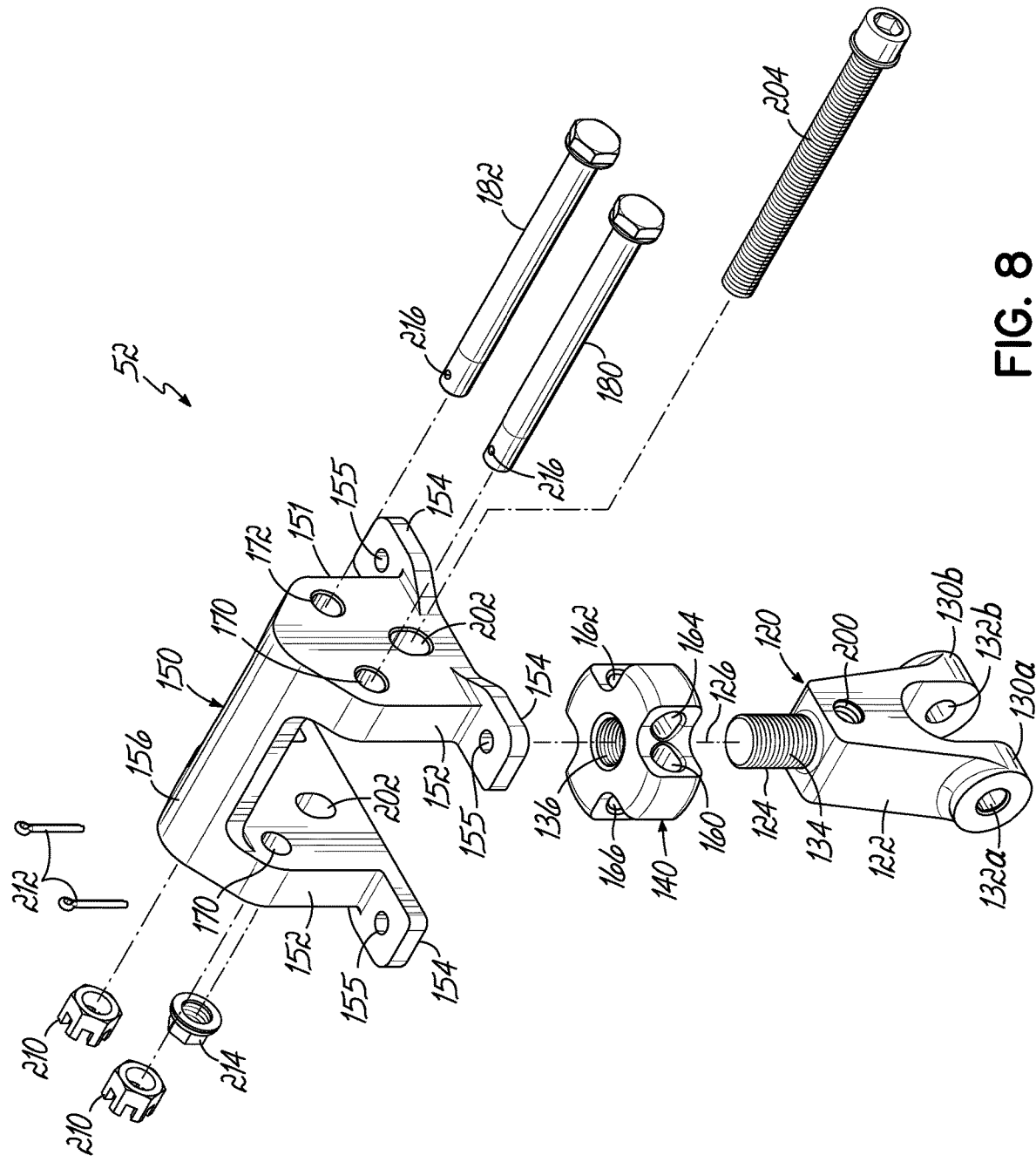
FIG. 8 is an exploded perspective view of a mounting system in accordance with an embodiment of the invention.

FIG. 8 illustrates an exploded view of a mounting system 52 in accordance with another embodiment the invention. Mounting system 52 includes a mounting element 120 having a base 122 and a threaded shaft 124 extending from the base along an axis 126. As with mounting system 50, the shaft generally will extend along the reference Z-axis when mounting system 52 is coupled with an appropriate fitting on surface 12. The illustrated mounting element 120 is in the form of a clevis element that is also generally u-shaped with opposing prongs 130a, 130b having apertures 132a, 132b extending therethrough. A pin or bolt 62 extends through the prongs 130a, 130b and respective apertures for coupling the base 122 and the overall clevis element 122 to a fitting, such as fitting 32, as illustrated in FIG. 9. The pin or bolt 62 also extends through an appropriate opening in the fitting 32, such as through the opening of a spherical bearing 34 (see FIG. 10C). In that way, the clevis element 120 is coupled to surface 12 and has a freedom of motion provided by spherical bearing 34. Clevis element 120 and shaft 124 also rotate about the axis of pin or bolt 62.

The threaded shaft 124 includes external threads 134 that match with internal threads in hole 136 of an incremental nut 140 that is configured for rotating on shaft 124. Specifically, the incremental nut 140 is configured for rotating on the threaded shaft and moving up and down along the shaft axis 126 for adjusting the height of a nut on the clevis element 120 and adjusting the height of a fitting 150. As with mounting system 50, the fitting might be made of aluminum and the clevis element and incremental nut of stainless steel.

The mounting system 52 also includes a fitting 150 that is configured for coupling with an adapter plate or other element to be mounted with the mounting system 52. Fitting 150 is configured to be mounted on a top surface of the mounting plate 22 is illustrated in FIG. 3. Whereas mounting system 50 has a fitting configured for mounting to a bottom surface of the adapter plate. Fitting 50 maybe coupled with an adapter plate 22 or some other element in a number of different ways and thus the invention is not limited to how the fitting of mounting system 52 might engage and couple with the adapter plate. Fitting 150 generally includes a base 151 that includes two opposing side elements 152 that each have one of more flanges 154 extending therefrom. Fitting 150 also includes a bridge portion 156 that couples with the side elements 152 of the base 151 and engages with other elements of the mounting system 52 for raising and lowering the fitting 150 as described herein. The flanges 154 may be secured to the adapter plate 22 with one or more fasteners 56 extending through appropriate openings 155 in the flanges.

Referring to FIG. 1A and 2 and FIG. 9, when the mounting system 52 is coupled with a fitting 32, the threaded shaft 124 would generally extend in what might be defined as the Z-axis of direction (see FIG. 1A) and that way, mounting system provides adjustment of the fitting 74 upwardly and downwardly along a Z-axis 126 which translates into a similar movement with respect to a portion of the adapter plate or other element that is mounted to surface 12 through the mounting system 52.

For coupling fitting 150 with the clevis element and incremental nut, the fitting 150 and incremental nut each include at least one aperture formed therethrough. When the fitting 150 is coupled with the incremental nut, the apertures are aligned for receiving one or more locking elements, such as locking pins, that pass through the aligned apertures for securing the incremental nut with the fitting. More specifically, an incremental nut aperture and a fitting aperture would be aligned at one of a plurality of rotational positions of the incremental nut along the threaded shaft.

Referring to FIG. 8, the incremental nut includes apertures 160, 162 extending on opposite sides of the incremental nut and on either side of the threaded opening 136. Generally, the apertures 160, 162 are formed parallel to each other on opposite sides of the nut and opening 136. The apertures 160, 162 act together and secure the fitting with nut 140 as described herein. The incremental nut 140 also includes another pair of parallel apertures 164, 166 each on an opposite side of the incremental nut and on either side of the threaded opening 136. The pair of apertures 164, 166 are oriented essentially perpendicular to the other pair of parallel apertures 160, 162 on the incremental nut. The fitting 150 includes corresponding apertures 170, 172 that may align with a respective pair of apertures 160, 162 or 164, 166 on the incremental nut 140, depending upon the rotation of the incremental nut along the threaded shaft 124. As such, the perpendicular pairs of apertures 160, 162 and 164, 166 provide alignment of the incremental nut apertures with the respective fitting apertures 170, 172 generally at 90° positions around the incremental nut. That is, as the incremental nut is rotated and nut apertures are aligned with apertures 170 and 172, the nut may be rotated 90° and again aligned with the apertures 170, 172. Apertures 160, 162 might be aligned at one rotational position with apertures 170 and 172, and then apertures 164, 166 might be aligned at another rotational position that is 90° for the first position. Respective locking pins 180, 182 pass through the aligned apertures 170, 172 and the respective incremental nut apertures, such as either aperture pair 160, 162 or aperture pair 164, 166. Again, with respect to the fitting 150, reference to an aperture 170 or 172 refers to the disconnected portions of a respective aperture that are positioned on either side of the fitting element and are aligned in space to form a single aperture, as illustrated in FIG. 8. As such, reference numerals 170 and 172 refer singularly to the various portions of the aperture that allow respective locking pins 180, 182 to pass through the entire fitting and through the aligned apertures in the incremental nut 140.

Accordingly, incremental nut 140 is configured for rotating on the threaded shaft and moving up and down along the shaft axis for adjusting the height of the nut, on the clevis element. Because the incremental nut and fitting are coupled together, the variation of the height of the nut also varies the height of the fitting 150 as illustrated by reference arrows 190 in FIG. 10A.

Figure 10A:
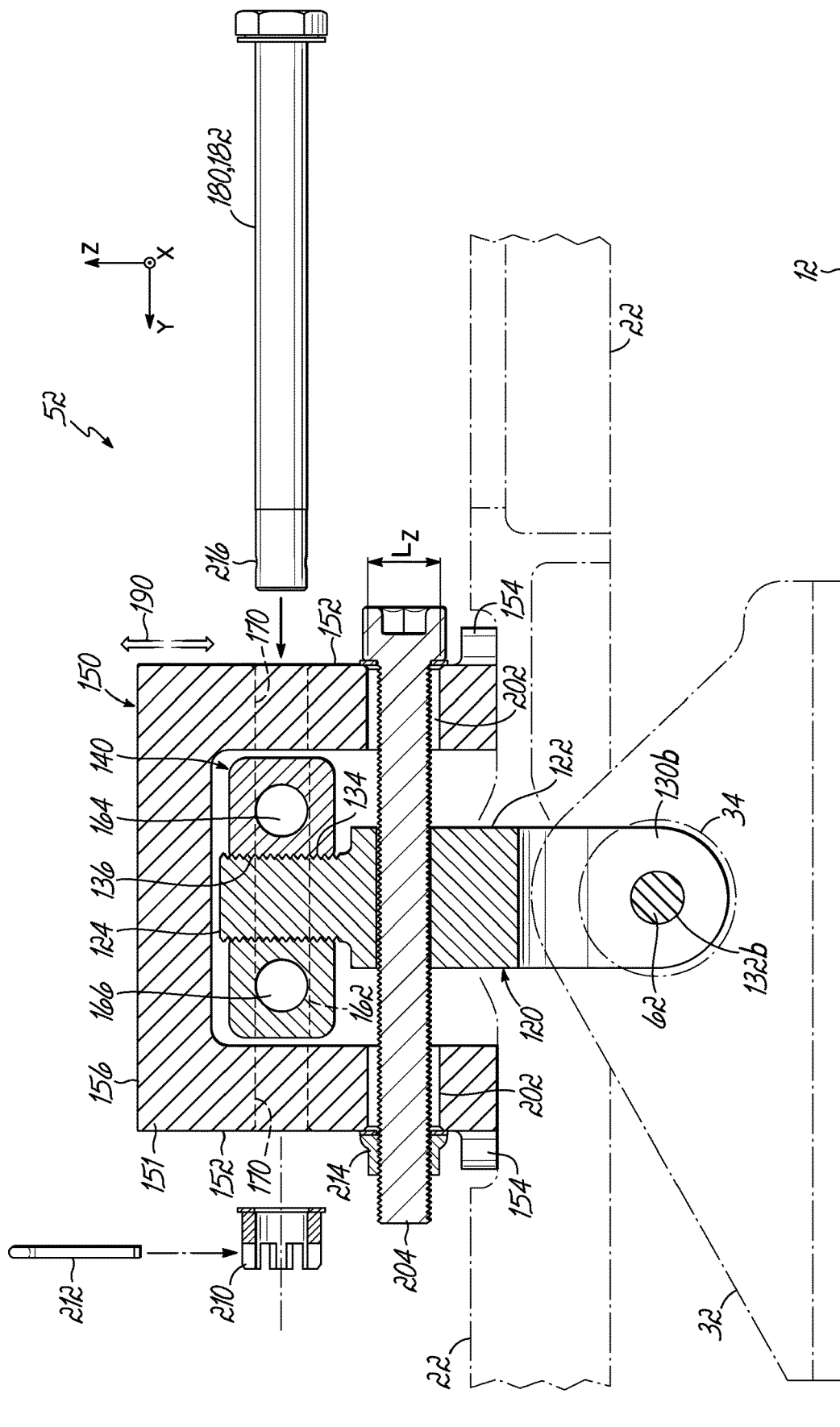
FIG. 10A is a cross sectional view of a mounting system in accordance with the embodiment of the invention illustrated in FIG. 8.
Figure 10B:
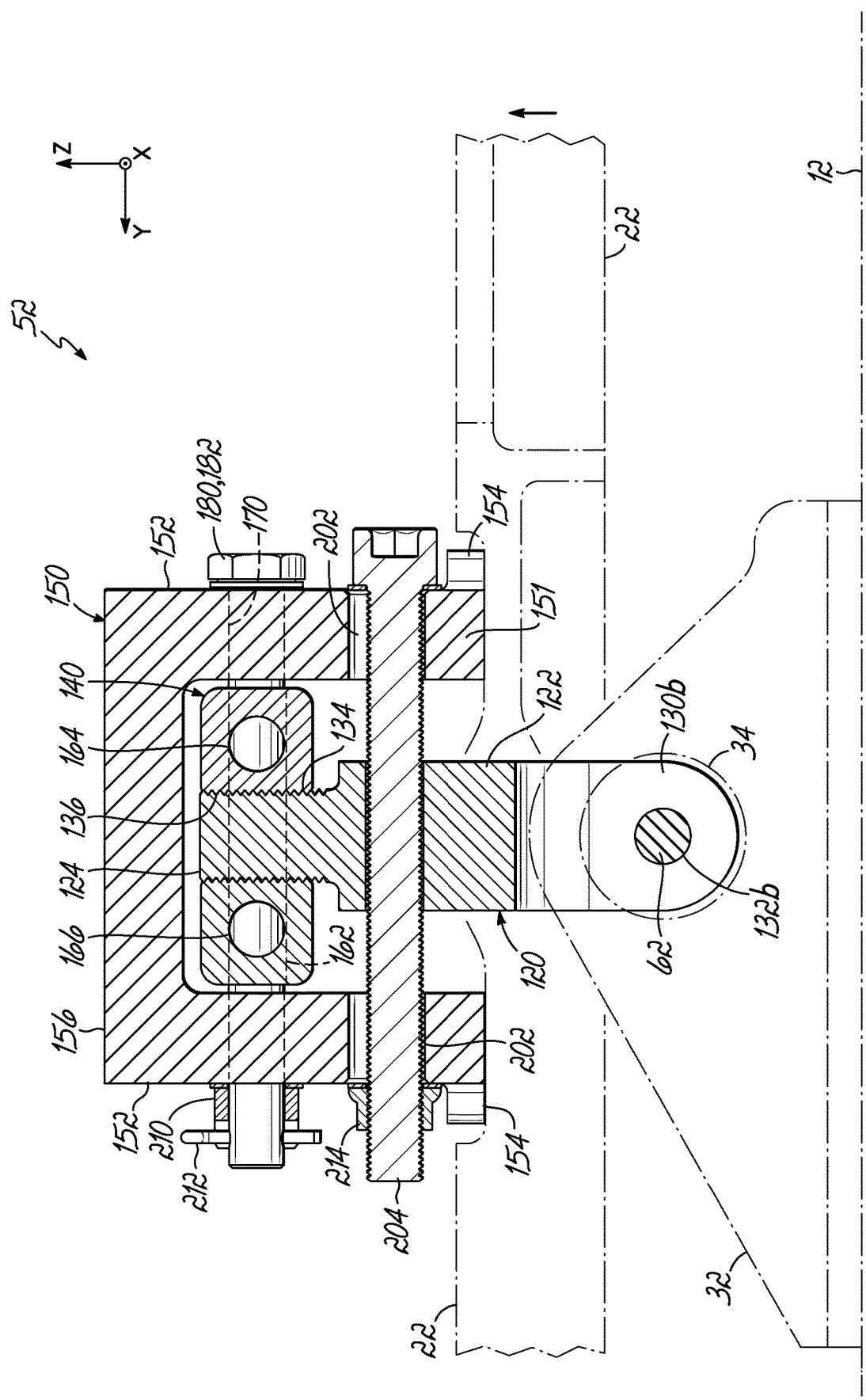
FIG. 10B is another cross sectional view of a mounting system in accordance with the embodiment of the invention illustrated in FIG. 8.
Figure 10C:
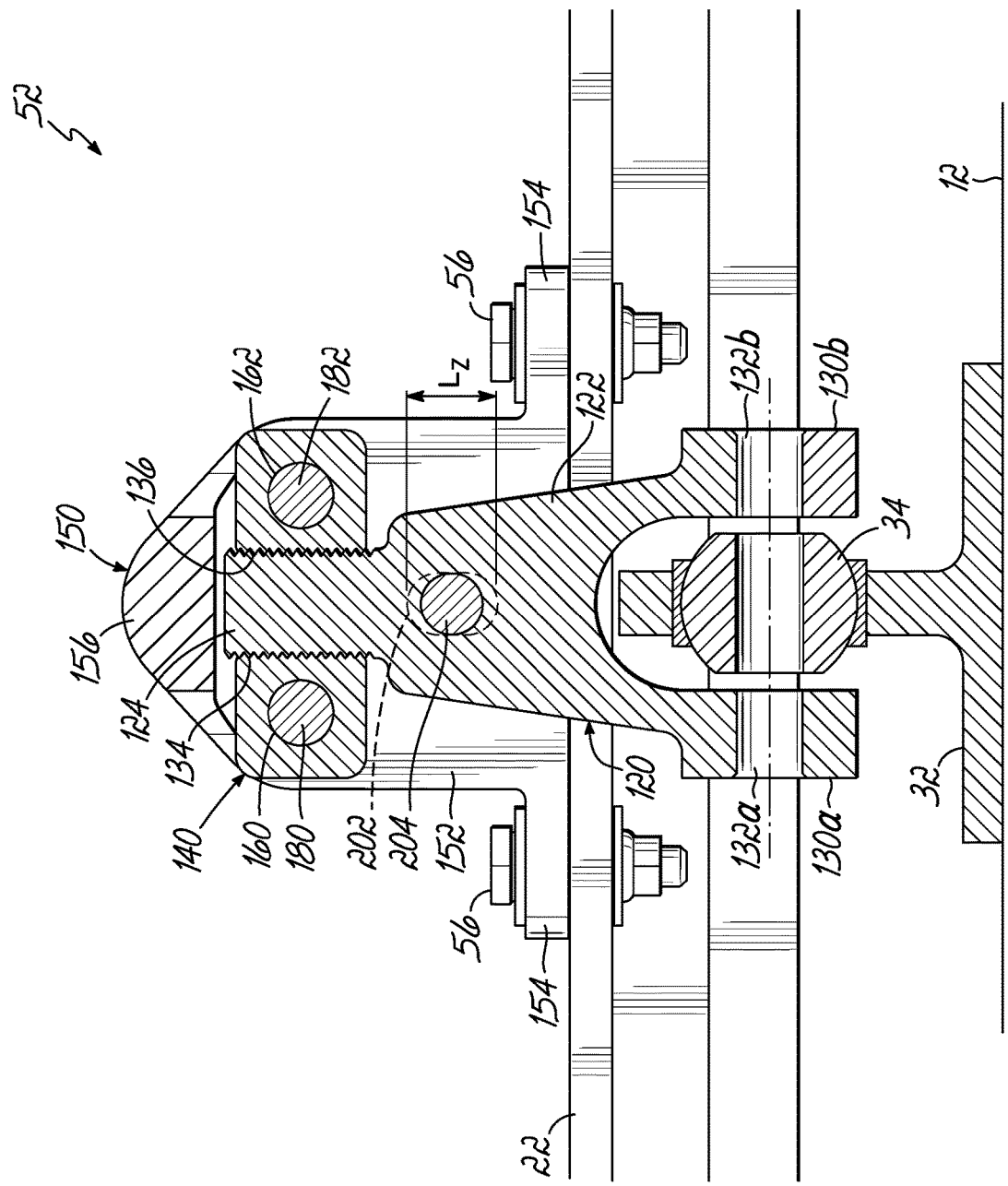
FIG. 10C is another cross sectional view of a mounting system in accordance with the embodiment of the invention illustrated in FIG. 8.

In accordance with another feature of the mounting system, the clevis element 120 has an aperture 200 formed through the base 122. The fitting has a corresponding aperture 202 formed in the base 151 and particularly through the side elements 152 of the base of the fitting. Aperture 200 aligns with aperture 202 formed in the base 151 of the fitting 150 when the fitting is positioned with the incremental nut and secured therewith using locking pins 180, 182. The apertures 200 and 202 are aligned for receiving a bolt 204 that extends through the fitting base aperture 202 as illustrated in FIG. 8 and also through the clevis element base aperture 200 for further securing the fitting with the clevis element. In accordance with one feature of the mounting system 52 invention, the fitting base aperture 202 is elongated in the Z-axis direction, which is essentially is the direction of the shaft axis 126 making reference to the Z-direction is defined in FIG. 1A. The elongated aperture has a length $L_z$ as illustrated in FIGS. 10A and 10C. That is, the aperture 202 is elongated in the direction of height adjustment similar to the elongated aperture 90 of mounting system 50. The bolt 204 is threaded as is the aperture 200.

The range of height adjustment for the mounting system is determined by the elongation dimension $L_z$ of the aperture 202. The elongation allows the nut 140 and the fitting 150 to move in the Z-axis with respect to the bolt 204 a certain distance and still achieve an alignment between the aperture 200 and bolt 204 and the aperture 202. This thereby allows incremental height adjustments of the fitting 150 based upon the rotation of the incremental nut 140. The range of height adjustment and alignment before the fitting aperture 202 would no longer align with aperture 200 depends upon the elongated length $L_z$ of aperture 202. As such, the length $L_z$ or effective height of the elongated aperture 202 as illustrated in FIGS. 10A and 10C provides an upper and lower limit with respect to the incremental and rotational height adjustment of the incremental nut 140 and fitting 150. Referring to FIG. 10B, the incremental nut is illustrated essentially at its highest position wherein bolt 204 engages the bottom of the elongated aperture 202. The $L_z$ with respect to aperture 202 may be in the range of 2 mm-6 mm and provide an overall height adjustment for fitting 150 and adapter plate 22 which is raised and lowered along with the fitting 150 as noted by reference arrow 210 in FIG. 10B.

When assembling the mounting system 52, incremental nut 140 may be coupled with shaft 124 of the clevis element and fitting 150 may be coupled with the clevis element through bolt 204 and the apertures 200, 202. Incremental nut 140 may be rotated in incremental fashion to a desired height. The fitting can move up and down with respect to bolt 204 due to the aperture 202. Incremental nut 140 may then be coupled with the fitting 150 through the appropriate locking pins 180, 182 extending through the aligned apertures of the fitting 150 and the respective aperture pairs in the incremental nut 140. The locking pins 180, 182 also prevent further rotation and lock the height of the nut For further adjusting the height of the fitting 150 and adapter plate 22, the locking pins 180, 182 may be removed and the incremental nut maybe rotated to move up or down on shaft 124 for varying the height. The locking pins 180 and 182 may then be reinserted to secure the incremental nut with the fitting and also to lock the height of the incremental nut 140 on shaft 124 and thus lock the height of the overall mounting system 52 with respect to surface 12. As noted, the incremental nut 140 may be adjusted in 90° rotational increments for alignment of the respective apertures 160, 162 or 164, 166 with the fitting apertures 170, 172. The height adjustment for each incremental rotation of the nut will again be determined by the thread count of threads used a couple shaft 124 and incremental nut 140.

In the illustrated embodiment of the invention, two apertures pairs are positioned generally perpendicular to each other to provide positions at 90° increments around incremental nut as discussed. However, the invention might also incorporate additional apertures or pairs of apertures, such as at 45° increments or positions around the nut 92. As may be appreciated, additional apertures, similar to apertures 160-166 might be formed through the side of the nut 140. As such, the present invention is not limited to having just two aperture pairs through nut 92 for achieving 90° increments of rotation and other smaller increments may be used. Similarly, just a single aperture pair might be used and the adjustability might be in 180° rotational increments achieved by aperture alignment.

The locking pins might be secured with the fitting and through the appropriate aligned apertures with appropriate cap nuts 210 and cotter pins or split pins 212 that extends through a receiving apertures 216 formed in locking pins 180, 182.

Bolt 204 will be threaded into the threaded aperture 200 and provides Y-axis adjustment to the fitting 150 with respect to the clevis element 120. Rotation of the threaded bolt 204, moves the bolt right or left with respect to the threaded aperture 200 in the clevis element and thus will move the fitting 150 left or right along the Y-axis. Once the desired position is achieved, the threaded bolt may be capped with the threaded cap-nut 214 as illustrated in FIG. 8 to lock the position of the fitting in the Y-axis.

Once the adapter plate 22 or portion thereof is mounted to surface 12 with mounting system 52, the portion or point of adapter plate is locked in the Y-axis and Z-axis. The parallel bolts 180, 182 will generally prevent rotation about that same Y-axis. In that way, the mounting system 52 does not provide rotational movement on the Y-axis as does the system of mounting system 50.

Accordingly, the mounting systems 50, 52 as described herein provide desired adjustment of the height of adapter plate 22 or some other element mounted to surface 12 using the mounting systems. Specifically, the height adjustable long Z-axis may be readily and incrementally achieved by rotation of the incremental nut elements of each of mounting systems. Once the desired height adjustment (Z-axis) and Y-axis adjustment are achieved, the incremental nuts may be locked into position with appropriate locking elements coupled with the incremental nuts and fitting elements to thereby lock the height of the fitting element and in turn the height of the adapter plate or other mounted element with respect to surface 12. The mounting systems further provide some linear and rotational freedom of movement along the Y-axis as disclosed herein in accordance with certain embodiments of the invention.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A mounting system for mounting an element to a surface comprising:
   a mounting element having a base and a threaded shaft extending from the base along an axis, the base configured for mounting to a surface;
   an aperture formed through the threaded shaft generally perpendicular to the shaft axis, the aperture being elongated in the direction of the shaft axis;
   an incremental nut configured for rotating on the threaded shaft and moving up and down along the shaft axis for adjusting the height of the nut on the mounting element;
   the incremental nut having at least one aperture formed therethrough generally perpendicular to the shaft axis;
   the incremental nut aperture and threaded shaft aperture being aligned at a plurality of rotational positions of the incremental nut along the threaded shaft;
   a locking element passing through aligned apertures for securing the incremental nut at a selected height on the mounting element;
   a fitting coupled with the incremental nut and further configured for coupling with an element to mount the element to a surface at a selected height above the surface.

2. The mounting system of claim 1 wherein the incremental nut includes a plurality of apertures, each aperture extending in the incremental nut at an angle to another aperture.

3. The mounting system of claim 1 wherein the incremental nut includes a pair of apertures with at least one aperture extending in the incremental nut at an angle generally perpendicular to another aperture, to provide alignment of the incremental nut aperture with the threaded shaft aperture generally at 90 degree positions around the incremental nut.

4. The mounting system of claim 1 wherein the fitting is coupled with the locking element for coupling to the incremental nut.

5. The mounting system of claim 1 wherein the fitting includes at least one aperture for receiving the locking element passing through the aligned apertures of the incremental nut and threaded shaft.

6. The mounting system of claim 1 wherein the locking element is a pin.

7. The mounting system of claim 1 wherein the fitting includes at least one flange for coupling with an element to be mounted, the flange positioned below the incremental nut.

8. The mounting system of claim 1 wherein the locking element includes a pin passing through the aligned apertures, the fitting configured for coupling with the pin and further configured to at least one of slide along the pin or rotate on the pin.

9. The mounting system of claim 1 wherein the threaded shaft aperture has an elongated dimension in the direction of the shaft axis in the range of 2 to 6 millimeters.

10. The mounting system of claim 1 wherein the mounting element is a clevis element.

11. A mounting system for mounting an element to a surface comprising:
    a mounting element having a base and a threaded shaft extending from the base along an axis, the base configured for mounting to a surface;
    an incremental nut configured for rotating on the threaded shaft and moving up and down along the threaded shaft axis for adjusting the height of the nut on the mounting element;
    the incremental nut having at least one aperture formed therethrough;
    a fitting configured for coupling with an element to mount the element to a surface at a selected height above the surface, the fitting including at least one aperture formed therethrough;
    the incremental nut aperture and fitting aperture being aligned at a plurality of rotational positions of the incremental nut along the threaded shaft;
    a locking element passing through aligned apertures for securing the incremental nut with the fitting at a selected height on the mounting element.

12. The mounting system of claim 11 further comprising:
    an aperture in the base of the mounting element;
    an aperture in the base of the fitting, the fitting base aperture being elongated in the direction of the threaded shaft axis;
    a bolt extending through the fitting base aperture and mounting element base aperture for securing the fitting with the mounting element, the bolt moving in the fitting base aperture when the height of the fitting is selected.

13. The mounting system of claim 12 wherein the fitting aperture has an elongated dimension in the direction of the threaded shaft axis in the range of 2 to 6 millimeters.

14. The mounting system of claim 12 wherein the aperture in the base of the clevis element is threaded and the bolt is threaded securing the fitting with the mounting element.

15. The mounting system of claim 11 wherein the incremental nut includes a plurality of apertures formed therethrough and the fitting includes a plurality of apertures formed therethrough, an incremental nut aperture aligned with a respective fitting aperture at a rotational position of the incremental nut along the threaded shaft, a locking element passing through aligned apertures for securing the incremental nut with the fitting at a selected height on the mounting element.

16. The mounting system of claim 15 wherein the plurality of apertures of the incremental nut includes at least one pair of parallel apertures extending on opposite sides of the incremental nut.

17. The mounting system of claim 16 further comprising multiple pairs of parallel apertures, one of the pairs of parallel apertures being oriented essentially perpendicular to the other pair of parallel apertures in the incremental nut to provide alignment of the incremental nut apertures with the respective fitting apertures generally at 90 degree positions around the incremental nut.

18. The mounting system of claim 11 wherein the locking element is a pin.

19. The mounting system of claim 11 wherein the fitting includes at least one flange for coupling with an element to be mounted, the flange positioned below the incremental nut.

20. The mounting system of claim 11 wherein the mounting element is a clevis element.

* * * * *